United States Patent Office  3,402,209
Patented Sept. 17, 1968

3,402,209
INSECTICIDAL TERTIARY ALCOHOLS
Everett E. Gilbert, Morris Township, Morris County, Pasquale Lombardo, East Hanover Township, Morris County, Edmund J. Rumanowski, Jersey City, and Bernard Sukornick, Elizabeth, N.J., assignors to Allied Chemical Corporation, New York, N.Y., a corporation of New York
No Drawing. Filed Mar. 1, 1965, Ser. No. 436,348
2 Claims. (Cl. 260—617)

This invention relates to new insecticidal products comprising tertiary alcohols, and to methods of using them, and to novel tertiary alcohols useful therein and to methods for their manufacture.

It is a principal object of the present invention to provide a method for controlling and destroying undesirable insect populations.

A further object of the present invention is to provide new insecticidal compositions comprising tertiary alcohols having both stomach and contact insecticidal activity.

A further object is to provide broad spectrum insecticides useful in control of such varied insects as beetle larvae, adult houseflies, aphids, and curculio.

Another object of the present invention is to provide novel tertiary alcohols.

Still a further object is to provide a process for the preparation of these tertiary alcohols. Other objects and advantages will become apparent from the following description.

In accordance with the present invention, undesirable insect population growth may be controlled and destroyed by subjecting said insects to the action of a tertiary alcohol corresponding to the general formula:

wherein R is a radical of the group consisting of alkyl, cycloalkyl, aralkyl, aryl, hydroxyaryl, alkaryl, alkoxyaryl and haloaryl. Generally speaking, the tertiary alcohols of the present invention may be classified as 2-substituted-2-hydroxy - 1,1a,3,3a,4,5,5,5a,5b,6 - decachlorooctahydro-1,3,4-metheno-2H-cyclobuta[cd]pentalene.

The tertiary alcohols may be prepared by reacting 1,1a, 3,3a,4,5,5,5a,5b,6 - decachlorooctahydro - 1,3,4 - metheno-2H-cyclobuta[cd]pentalene-2-one, hereinafter simply referred to as DCMP, with the compounds R—H. DCMP is a white solid which melts with decomposition at approximately 360° C., has an empirical formula of $C_{10}Cl_{10}O$ and is commercially available as a hydrate under the trademark "Kepone" from Allied Chemical Corporation.

The reaction between DCMP and the compounds RH is not self-promoting, however, and necessitates the presence of a catalyst or employment of the organometallic derivative of the radical R. Preference of one method over the other is generally dictated by the chemical nature of the radical R.

The organometallic compounds may be represented by the formula:

$$R—Y$$

wherein R is defined above and Y is a member selected from the group consisting of magnesium halides and lithium. Such derivatives of a magnesium halide, such as magnesium chloride, bromide or iodide, are widely known as Grignard reagents. Preparation of these Grignard reagents is conventional; they are prepared by admixing aromatic or aliphatic halides with metallic magnesium turnings in a suitable anhydrous solvent such as ether or tetrahydrofuran. This reaction may be represented generally by the folowing equation:

$$R—X + Mg \xrightarrow{\text{ether}} R—MgX$$

wherein R is as heretofore defined and X is a halogen.

The organometallic compounds wherein Y is lithium are also readily prepared by the direct reaction of the desired halide derivative, R—X, with lithium in the presence of a suitable anhydrous solvent such as ether, benzene or cyclohexane. The reaction may be represented by the following equation.

$$R—X + 2Li \xrightarrow{\text{ether}} R—Li + LiX$$

wherein R and X are as defined above.

The organometallic compound R—Mg—X or R—Li is next reacted with DCMP. Although the organometallic derivative may first be isolated from the medium in which it is prepared, it is preferred, for the sake of convenience, to utilize this same medium in the subsequent reaction with DCMP.

The molar ratio of DCMP to the organometallic derivative, R—Y, is not critical but preferably, 1 to 1.5 mols of R—Y per mol DCMP is employed.

The reaction temperature also is not critical and may vary over a wide range. Acceptable yields have been obtained at reaction temperatures within the range from about room temperature up to the boiling point of the mixture. Temperatures from 50 to 130° C. are preferred. Reaction times may vary from about 1 to 8 hours and, preferably, for economical operation, 0.5 to 3 hours.

The organometallic reactant forms with DCMP an addition product.

In order to effect conversion to the desired tertiary alcohol, hydrolysis is necessary. Thus, the reaction mixture may be drowned in water in an amount of from about 1 to 20 parts water per part reaction mixture.

The tertiary alcohol so produced may be recovered by first separating and discarding the aqueous phase and, thereafter, subjecting the organic phase, having in solution the tertiary alcohol, to vacuum distillation in order to remove the solvent and excess reactants. Purification may be effected by conventional steps, such as redissolving the tertiary alcohol in a suitable solvent and separating it by crystallization.

In the reaction of DCMP with an organolithium derivative of the general formula:

R—Li preferred conditions involve a molar ratio of from about 1 to 1.5 mols organolithium derivative per mol DCMP, a reaction temperature of from about 0 to 50° C. and a reaction time of from about 0.5 to 3 hours, using as anhydrous solvent medium, such as an ether, thereafter adding water to the reaction mixture and recovering the resulting tertiary alcohol.

A suitable process for preparation of the hydroxyphenyl tertiary alcohols comprises reacting DCMP with the phenol in the presence of a suitable catalyst. It has been found that Bronsted acids promote reaction and produce high yields.

Generally speaking, a Bronsted acid is defined as a compound which loses a proton. Illustrative of such acids are mineral acids, and organic acids including carboxylic and, most particularly, sulfonic acids. Mineral acids are deemed to include hydrochloric, hydrofluoric, polyphosphoric, phosphoric, sulfonic and nitric, and carboxylic acids to include trifluoroacetic, perfluorooctanoic and the like.

Suitable sulfonic acids correspond to the general formula:

R—SO$_2$OH wherein R is a radical selected from the group consisting of substituted and nonsubstituted alkyl, aryl, alkaryl and aralkyl.

Illustrative examples of such sulfonic acids are methanesulfonic acid, ethanesulfonic acid, propanesulfonic acid, hexanesulfonic acid, nonanesulfonic acid, 3-chloropentanesulfonic acid, 3,5-dimethylheptanesulfonic acid, dodecanesulfonic acid, benzenesulfonic acid, toluenesulfonic acid, xylenesulfonic acid, dodecylbenzenesulfonic acid, chlorobenzenesulfonic acid, ethylbenzenesulfonic acid, and mixtures thereof. It has been found that preparation of the desired hydroxyphenyl tertiary alcohols employing a sulfonic acid catalyst such as p-toluene sulfonic acid necessitates reaction temperatures below 140° C. Higher temperatures tend to produce increasing proportions of products which do not contain the tertiary alcoholic group. When sulfuric acid is utilized as catalyst, even lower temperatures, i.e. below about 100° C., are necessary in order to avoid the undesired reaction.

The amount of Bronsted acid present during reaction is not critical. In the case of the listed sulfonic acids, preferably, 1 to 20 percent, of the total amount of reactant, by weight, may be used.

A solvent may be employed during reaction provided it is inert under the conditions of reaction and is a solvent for the reactants. Suitable solvents include xylene, toluene, halogenated aromatics. Amount of solvent is not critical but in preferred operation, is employed in the amount of from about 2 to 10 parts solvent per part DCMP reactant.

Recovery of the desired tertiary alcohol from reaction product of the Bronsted acid catalyst process, involves conventional steps, for instance, removing solvent and excess volatile reactants by vacuum distillation, redissolving the reaction product in a suitable solvent such as toluene, xylene, or benzene and separating the desired product by crystallization.

Preferred operation of this process comprises reacting DCMP with the hydroxyphenyl compound, RH, in a molar ratio of from about 0.5 to 1.5 mols hydroxyphenyl compound per mol DCMP at a reaction temperature below 140° C., for a reaction period of 1 to 50 hours in the presence of a sulfonic acid, and thereafter recovering the resulting tertiary alcohol.

The following examples are given for the purpose of illustrating preparation of the tertiary alcohols of the present invention. In the examples, parts are by weight.

EXAMPLE 1

In order to prepare a tertiary alcohol of the general formula hereinbefore recited wherein R is methyl, the following procedure was followed:

Preparation of methyl Grignard reagent

A reaction mixture comprising 80 parts ethyl ether, 14.2 parts (0.1 mol) methyliodide, and 2.4 parts (0.1 mol) magnesium metal turnings was admixed and agitated for a period of 4 hours.

The resulting ether solution containing methyl magnesium bromide was filtered to remove unreacted magnesium.

Reaction with DCMP

To the ethyl ether solution containing the resulting methyl Grignard reagent were added 49 parts of anhydrous DCMP dissolved in 480 parts of xylene. The resulting reaction mixture was heated, under constant agitation, to a temperature of 100° C. in order to remove ethyl ether by distillation. The reaction mixture was heated to reflux temperature (about 100° C.) and maintained under this condition for about 20 hours. At the end of this period, the mixture was drowned with about 200 parts of a dilute aqueous hydrochloric acid. The resulting xylene solution containing 2 - hydroxy - 2 - methyl-1,1a,3,3a,4,5,5,5a,5b,6-decachlorooctohydro - 1,3,4 - metheno - 2H - cyclobuta [cd] pentalene was twice water-washed and finally dried over anhydrous calcium chloride. Xylene was removed by vacuum distillation to yield a white solid which was then redissolved in methylene chloride. Hexane was added and the resulting solution distilled until crystallization commenced. Crystallization was accelerated by cooling the reaction mixture and the resulting product recovered by filtration and purified by washing with hexane, followed by drying. 41 parts of product corresponding to a yield of 80% of theory and having a decomposition point, without melting, above 300° C., were obtained.

Utilizing the Grignard reagent, R-Mg-Br, and the procedure employed in Example 1, the following compounds, set forth below in Table I, were prepared.

TABLE I

| Example | Radical R | Melting point $^4$ ° C. |
|---|---|---|
| 2 | n-Butyl | d. above 400. |
| 3 | n-Hexyl | 338-342. |
| 4 | n-Decyl | 342-346. |
| 5 | n-Dodecyl | d. above 400. |
| 6 | n-Octadecyl | Do. |
| 7 | 2-phenylethyl | 350 (d.). |
| 8 | Benzyl | 306-316 (d.). |
| 9 | Cyclohexyl | d. above 400. |
| 10 | 4-chlorophenyl | 224-234. |
| 11 | 2-methoxyphenyl | 247-250. |
| 12 | 4-methoxyphenyl | 198-200. |
| 13 | Phenyl | 189-193. |

The following example illustrates the use of a lithium phenyl derivative in the preparation of the corresponding tertiary alcohol.

EXAMPLE 14

Preparation of phenyllithium

Phenyllithium was prepared by a standard procedure, essentially as described by Sitman et al., J. Am. Chem. Soc., 54, 1957 (1932).

Briefly, an ether solution comprised of 18.8 parts of bromo-benzene and 1.8 parts of lithium was prepared. This solution was agitated for a period of about 0.5 hour.

Reaction with DCMP

To the solution containing lithium phenyl as prepared above, were added 15 parts DCMP dissolved in xylene over a period of 0.5 hour at a temperature below 30° C. The resulting reaction mixture was stirred for an additional hour at room temperature whereupon hydrolysis was effected by drowning the reaction mixture with 100 parts of water. Ether was removed by evaporation and the resulting mass was heated in a 5% aqueous sodium hydroxide solution to remove unreacted Kepone. The phenyl DCMP tertiary alcohol was recovered by filtration, purified by water washing and finally, oven dried. It is a white crystalline solid identical to the product of Example 13.

The following example illustrates the use of Bronsted acid catalysts for the preparation of the subject DCMP tertiary alcohols.

EXAMPLE 15

A reaction mixture comprising 49 parts DCMP hydrate, and 90.2 parts of phenol were melted together at a temperature of 80° C. At the end of this period, 2.8 parts p-toluene-sulfonic acid together with 4.2 parts of water were added, and the reaction mixture was heated for a period of 9 hours. The resulting mixture containing the hydroxyphenyl derivative of DCMP tertiary alcohol was then poured into about 1500 parts of water and filtered in order to remove solid product which was purified by water washing and oven dried for a period of about 17 hours. At the end of this period, the solid product was twice recrystallized from 15% aqueous methanol and 38 parts of product, DCMP 2-hydroxy-2-hydroxyphenyl compound corresponding to a theoretical yield of 80%, having a melting point of 260°-262° C., with slight decomposition, were recovered.

Elemental analysis showed carbon 32.8%, hydrogen 1.04% and hydroxyl content of 3.0% which is in excellent agreement with the theoretical values of carbon 32.86%, hydrogen 1.03% and hydroxyl content of 2.91%.

When Example 15 is repeated using $H_2SO_4$ at 100° C. or using anhydrous HCl, or polyphosphoric acid, the same product is obtained but in considerably lower yield.

As indicated above, the compounds of this invention find valuable application as insecticidal toxicants. They are ordinarily applied as such in conjunction with a carrier which may be liquid, solid, or gaseous and, if desired, with secondary toxicants. The amount of toxicant used may vary widely, a sufficient quantity being utilized to provide the desired toxicity.

Preferred formulations include wettable powders, dusts, emulsifiable concentrates, granules, and baits.

Wettable powders are water-dispersible compositions comprising active material, an inert solid, and one or more wetting agents. The inert solids are preferably of mineral origin and the wetting agents are preferably anionic or non-ionic. Suitable wetting agents for use in such compositions are listed by J. W. McCutcheon in "Soap and Chemical Specialties," December 1957, January, February, March and April 1958. The classes of solids most suitable for wettable powder formulations are the natural clays, diatomaceous earth, and synthetic mineral fillers derived from silica and silicate. Dispersing agents are also used in preparing these wettable powders. Wettable powder formulations may contain from about 25 to 75 weight percent active material, from about .5 to 5 weight percent wetting agent, from about .5 to 1.5 weight percent dispersant, and from about 20 to 70 weight percent inert solid. The wettable powder may also contain corrosion inhibitors in an amount not in excess of 0.5 weight percent or an anti-foaming agent in an amount not in excess of 0.1 weight percent, or both, replacing equivalent amounts of the inert solids.

Dusts are dense, free-flowing powder compositions which are intended to be applied in dry form. They are comprised of an active material and a dense, free-flowing solid. They may also contain a wetting agent and an inert absorptive grinding aid. Examples of preferred inert solids are micaceous talcs, dense kaolin clays and tobacco dust. The grinding aids are similar to those used as inert solids in the wettable powders. The wetting agents are also similar to those used in the wettable powder formulation. The dust compositions preferably comprise about 1 to 20 weight percent active material, about 1 to 15 weight percent grinding aid, and about 65 to 98 weight percent extender. Such dust formulations may contain dispersing agents, corrosion inhibitor agents. Further, the wettable powders described above may also be used in the preparation of dusts with appropriate substitution of ingredients.

Emulsifiable concentrates are usually solutions of active material in water-immiscible solvents together with an emusifying agent similar to the wetting agents referred to, supra. Suitable solvents are hydrocarbons, and non-water miscible ethers, esters, or ketones, e.g., benzene, alkylated naphthalenes, ethyl acetate, butyl ether, and dibutyl ketone. The emusifiable compositions comprise from about 20 to 90 weight percent active material, about 0 to 78 weight percent solvent, and about 2 to 10 weight percent emulsifying agent. The resulting emulsifiable concentrate may be incorporated with water in a quantity sufficient to form an aqueous spray dispersion or emulsion having the desired active ingredient concentration.

Granules comprise active material absorbed in or intermingled with an inert carrier. A wetting agent may be present as a leaching aid. The inert carrier and the wetting agent are similar to the inert solids and wetting agents referred to, supra. The granule can be either composed of a material which will absorb the active liquid material or it can be non-absorbent, wherein the granular material is blended and mixed with the active liquid material. The preferred granular formulations comprise about 8 to 60 mesh granules containing from about 1 to 20 weight percent active material and about 80 to 99 weight percent inert carrier.

Baits are mixtures of active material with substances which are attractive to insects such as food or breeding materials. General examples of foods cover inexpensive natural sweetening agents, fats, and proteins. Specific examples are sugar, wheat, bran, peanut butter, and lard. The baits can be in liquid, paste, or solid forms and preferably contain about .05 percent to 1 percent by weight of active material.

The preferred tertiary alcohols of the present invention are those which are solid at a temperature of about 300° C. As may readily be appreciated, the solid tertiary alcohols are more adaptable for the preparation of insecticidal compositions than their liquid counterparts. More simply stated, tertiary alcohol possessing a melting point of about 300° C. or higher are not susceptible to excessive contamination by reason of thermal degradation and, moreover, are readily admixed with solid insecticidal carriers. Of course, if a liquid insecticidal carrier be desired, suitable inert liquid carriers, as heretofore described, may readily be utilized. Characteristic of the subject tertiary alcohols which are solids and exhibit thermal stability in the range of about 300° C. and higher are those compounds which are directly linked to the tertiary carbon of the DCMP moiety by an aliphatic carbon atom. Of these particular compounds, the methyl derivative has been found to exhibit outstanding insecticidal as well as chemical and physical properties which are more fully discussed below.

The following test procedures were used in determining the effective pesticidal properties of the subject tertiary alcohols.

(1) Test for pea aphids.—English broad bean plants are sprayed for 2 seconds on upper surface of leaves and 5 seconds on under surface. The spray consisted of a 0.25% by weight solution of DCMP tertiary alcohol in acetone. Adult female aphids are brushed from unsprayed infested English broad bean plants into 5-inch screen wire hemispheres and sprayed for 5 seconds. Following treatment, aphids are caged over previously sprayed plants and the mortality rate determined after a period of three days.

(2) Test for Mexican bean beetle larvae and southern armyworm.—Horticultural (cranberry) bean plants in 2½" pots, with all foilage removed except one primary leaf, are sprayed for 2 seconds on the upper surface of the leaf and 5 seconds on the under surface of the leaf. The spray consisted of a 0.25% by weight solution of DCMP tertiary alcohol in acetone. After spraying, deposits are allowed to dry on plants and 5 3rd instar larvae are then confined on each plant within 6-inch screen wire spheres. Mortality records are made three days after treatment.

The results obtained by employing the above recited test procedures are as follows:

| Radical R | Percent kill | |
|---|---|---|
| | Mexican bean beetle larvae | Southern armyworm |
| Methyl | 100 | 100 |
| Methyl [1] | 60 | 100 |
| n-Butyl | 100 | 100 |
| n-Decyl | 100 | 100 |
| n-Dodecyl | 60 | 100 |
| n-Octadecyl | 80 | 100 |
| 2-phenylethyl | 100 | 100 |
| Benzyl | 80 | 100 |
| Cyclohexyl | 100 | 100 |
| Phenyl [2] | 100 | 100 |
| Phenyl [1,2] | 0 | 100 |
| 4-chlorophenyl | 100 | 100 |
| 4-methoxyphenyl | 100 | 100 |
| 4-methoxyphenyl [1] | 0 | 100 |
| 2-hydroxyphenyl | 100 | 100 |
| 4-hydroxyphenyl | 80 | 100 |
| Hydroxyphenyl [3] | 100 | 100 |

[1] Used as an aqueous spray of 25% wettable powder which, in turn was comprised of 98% by wt. carrier ($SiO_2$, 67.0%; $Fe_2O_3$, 4.0%; $Al_2O_3$, 12.5%; MgO, 11%; CaO, 2.5%; others, 3%), 1% by wt. wetting agent (sodium dodecylbenzene sulfonate), 1% by wt. dispersing agent (polyvinyl alcohol); at a dosage of 1 lb./100 gallons.
[2] Prepared by method of Ex. 1 using bromobenzene.
[3] Isomeric mixture of ortho and para compounds.

Pea aphids

Radical R: Percent kill
Methyl (Example 1) _____ 100
Phenyl (b) _____ 100
2-hydroxyphenyl (Example 15) _____ 80

House Flies

A solid feed-bait carrier composed of 6 parts of powdered non-fat dry milk, 6 parts granulated sugar and one part powdered egg was treated with the subject methyl tertiary alcohol, (2-hydroxy-2-methyl-1,1a,3,3a,4,5,5,5a, 5b,6-decachlorooctahydro - 1,3,4 - metheno-2H-cyclobuta [cd] pentalene), as an acetone solution. After agitation the acetone was removed by distillation and the resulting treated solid feed was ground to a powder using a mortar and pestle. The concentration of the methyl tertiary alcohol was 0.0156% by weight of the amount of bait utilized. The bait so prepared was fed upon by adult house flies. At the end of a seven day period a 98% kill of the insects was realized. The phenyl and 4-methoxy phenyl DCMP tertiary alcohols gave kills of 85% at .03% concentration and 100% at 1% concentration, respectively, when similarly tested.

Colorado potato beetle larvae

Potato vine terminal cuttings, 6 to 8 inches long were sprayed with an aqueous spray of 25% wettable powder at the rate of ½ ounce methyl tertiary alcohol per 100 gallons water. The wettable powder composition was 25% active ingredient, 74% clay, 0.5% wetting agent and 0.5% dispersant. Colorado potato beetle larvae (8–9 days old) were then placed on the cuttings. At the end of 24 hours a 100% kill of the larvae was realized. The corresponding phenyl compound, similarly tested, gave a 30% kill.

Plum curculio

Small green apples were sprayed for ten seconds utilizing the compound as an aqueous spray of wettable powders (25% active ingredient) at a concentration of 8 oz. of the methyl tertiary alcohol per 100 gallons of water. The deposits were allowed to dry on the apple before the beetles were allowed to feed thereon. At the end of the first day a 80% kill of the beetles was realized and, by the 4th day, 100% kill was realized. The corresponding phenyl compound, similarly tested, gave a 60% kill.

German roach

A bait was prepared of three parts cornmeal and one part sugar admixed with 0.125% by weight of the methyl tertiary alcohol based upon the total amount of bait employed. Both male and female roaches were permitted to feed upon the bait for a period of days. After eight days, 100% kill was realized. The corresponding phenyl compound gave a 60% kill in the same period. The 4-methoxy phenol compound surprisingly gave a 100% kill of males in this period without destroying females.

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

We claim:
1. A tertiary alcohol having a melting point of from about 300° C. and higher and having the formula:

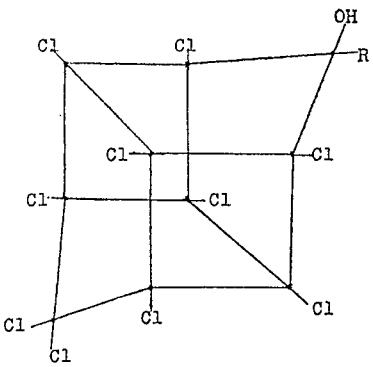

wherein R represents a hydrocarbon radical having up to 18 carbon atoms and united to the alcoholic tertiary carbon atom by an aliphatic carbon atom.

2. A tertiary alcohol having the formula:

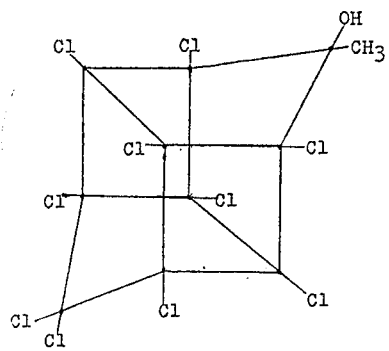

References Cited

UNITED STATES PATENTS

| 2,332,867 | 10/1943 | Niederl. | |
| 2,497,503 | 2/1950 | Jones. | |
| 3,055,948 | 9/1962 | Hoch et al. | |
| 3,240,808 | 3/1966 | Gilbert | 167—30 X |

BERNARD HELFIN, *Primary Examiner.*

H. MARS, *Assistant Examiner.*